UNITED STATES PATENT OFFICE.

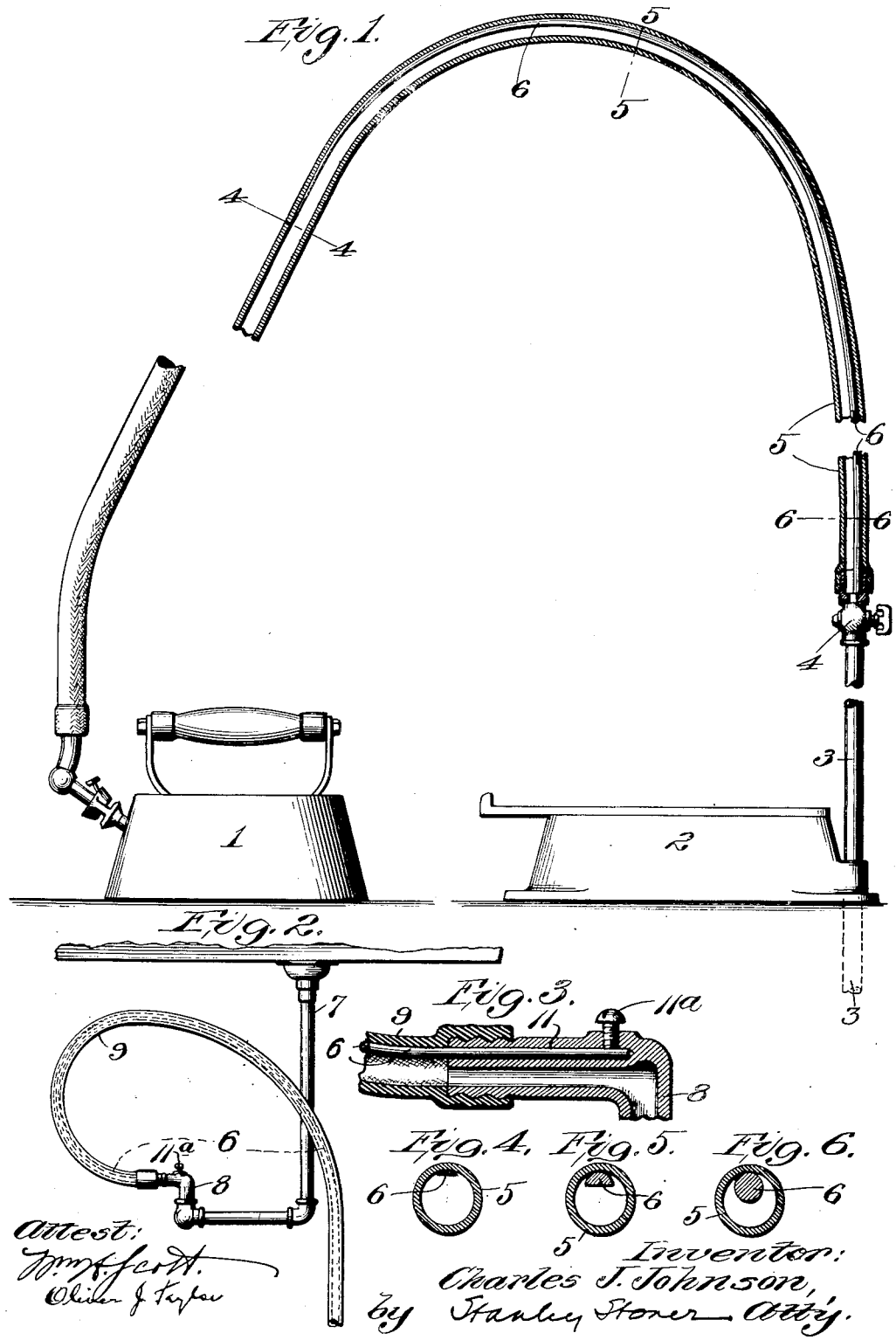

CHARLES J. JOHNSON, OF CEDAR RAPIDS, IOWA, ASSIGNOR TO JOHNSON GAS APPLIANCE COMPANY, OF CEDAR RAPIDS, IOWA, A CORPORATION.

AUTOMATIC TUBING-SUPPORT.

1,126,673.  Specification of Letters Patent.  Patented Jan. 26, 1915.

Application filed March 30, 1914.  Serial No. 828,250.

*To all whom it may concern:*

Be it known that I, CHARLES J. JOHNSON, of Cedar Rapids, county of Linn, State of Iowa, manufacturer, have invented certain new and useful Improvements in Automatic Tubing-Supports; and I hereby declare that the following is a full, clear, and exact description of the same.

The invention has particular reference to tubing or hose through which a flow of gas is supplied to any movable object. The tubing has one end fixed, as at a gas bracket in the wall, or other similar device, and the other end is moved to and fro as required. The difficulty which I seek to overcome is that this tubing has a tendency to drop or get in the way of the operator, while my device keeps the tubing away from the operator, without any pulling or undue strain on the tubing or hose. I accomplish this object by means of the mechanism or device shown in the accompanying drawing, forming a part of this specification, in which—

Figure 1 shows a general side view thereof, partly in section, Fig. 2 shows the device attached to a ceiling gas fixture, Fig. 3 shows a longitudinal section of the fixed end of the device, and Figs. 4, 5 and 6 show cross sections through a tube or hose furnished with the device, but taken at different distances from the fixed end, to-wit, 4—4, 5—5 and 6—6.

1 is the movable object, which for illustrating my invention I have shown as a laundry iron, and 2 is a rest therefor, 3 is a fixed gas pipe, the gas flow being controlled by the cock at 4.

5 is the flexible tube or hose conveying the gas to the movable object 1, and 6 is a long, outwardly tapered and resiliently flexible piece of spring metal, hereinafter termed the supporting spring, the larger end of which is secured in the cock, so that it is rigidly attached at one side of the bore of the cock, and projects longitudinally in contact with the inner surface of the tube, for the purpose of keeping that end of the tube elevated.

Figs. 2 and 3 show the device attached to a ceiling gas fixture 7, having a joint 8 and tube 9. The spring 6 holds the tube first outward and then upward, free from the operator. The inner or butt end 11 of the spring in this form is shown secured in place by a set screw 11$^a$. From said butt end 11 outward, the supporting spring 6 is gradually cut away or tapered to its outer end, so that greater flexibility is given the farther the distance from the fixed end. This is clearly shown in Figs. 4, 5 and 6. The supporting spring 6 is preferably made from round steel rod. But I do not limit myself to a round rod. A square or flat one may be used instead; but with the cut away surface of the spring turned away from the adjacent surface of the tubing as shown in Figs. 4 and 5, a rounded surface contacts at all times with the tubing, and the latter is protected against wear.

The spring is of less diameter than the inside bore of the tubing, so as not to interfere with the free flow of gas. And since it is placed inside the tubing an incidental result is that it prevents it from kinking. The valuable feature of the device as applied to the gas tubing of a laundry iron, as shown in Fig. 1, is that the tendency to keep the tubing elevated takes up all the slack, thus preventing the tubing from coming into contact with the hot iron and thereby being burnt, or getting in the way of or entangled in the hands of the operator.

I am aware that it is old to use a bent arm to support a tubing and also to insert a nearly rigid but "flexible" or bendable wire and more or less resilient coiled wire within a tubing; but these devices, applied to the gas tubing of a laundry iron or the like, do not prevent the tubing from becoming slack and interfering with the operator. The principal object which I accomplish is to so control the slack of the tubing, or hose that as the iron or other object is moved nearer to the fixed end of the tubing or hose, it is automatically elevated or moved out of the way of the operator. When the object is moved away from the fixed end, the necessary freedom of motion is not impeded by any undue strain on the tubing or hose. Further, the device permits the changing of position of the movable object, such as the iron, without any slack or dropping of the tubing or hose, as the supporting spring 6 lifts it away from the operator's hands.

The invention is adapted for use with gas tubing or like tubing forming a flexible electric wire conduit. In the appended claims the term "tubing" is intended to include such tubing or flexible conduits.

What I claim as new and desire to secure by Letters Patent of the United States is,

1. An automatic tubing support comprising a fixed member to which one end of the tubing is coupled, and a long and resiliently flexible supporting spring within said tubing; which spring has a butt end rigidly attached to said fixed member, a free end at a distance from said butt end, projects longitudinally in contact with the inner surface of the tubing at one side only, and is tapered from said butt end to said free end to equalize its supporting strength at different distances from said fixed member; substantially as described.

2. An automatic tubing support comprising a fixed member to which one end of the tubing is coupled, and a long outwardly tapered and resiliently flexible supporting spring within said tubing at one side thereof; said spring having a butt end rigidly attached to said fixed member, a free end at a distance from said butt end, a rounded back in contact with the inner surface of the tubing, and a cut-away surface out of contact with the tubing, substantially as described.

3. In a tubing outfit for an object movable back and forth, the combination with a fixed pipe to which one end of the tubing is coupled of a long and resiliently flexible supporting spring having a vertical butt end fixedly attached to said pipe at one side of its bore, a free end at a distance from said butt end, tapered from said butt outwardly, contacting with the inner surface of said tubing, and adapted to take up slack in said tubing as said object is moved back and forth; substantially as described.

CHARLES J. JOHNSON.

Witnesses:
H. E. SPANGLEY,
LIBBIE BLAHA.